United States Patent
Black, Jr. et al.

(10) Patent No.: US 8,906,484 B1
(45) Date of Patent: Dec. 9, 2014

(54) SYSTEM OF COMPOSITE ARMOR INCLUDING RELEASE LAYERS

(75) Inventors: Joseph Benson Black, Jr., Redondo Beach, CA (US); Patrick J. Thrash, Corona, CA (US); Robert Eugene Turley, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 13/462,228

(22) Filed: May 2, 2012

(51) Int. Cl.
*B32B 5/12* (2006.01)
*F41H 5/04* (2006.01)

(52) U.S. Cl.
CPC ............... *F41H 5/0478* (2013.01); *B32B 5/12* (2013.01); *Y10S 428/911* (2013.01)
USPC .............. 428/105; 442/135; 428/911

(58) Field of Classification Search
CPC ............ B32B 18/00; B32B 5/16; B32B 5/12; F41H 5/04
USPC ......... 2/2.5; 28/103, 106, 107, 160, 170, 184, 28/196; 89/36.01; 112/104, 475.17; 428/41.8, 43, 47, 52, 54, 57, 98, 101, 428/102, 103, 104, 105, 107, 192, 193, 194, 428/221, 222, 223, 911; 442/135, 183, 239, 442/240, 241, 242, 246, 247, 255, 268, 270, 442/271, 275, 276, 281, 394, 402
See application file for complete search history.

(56) References Cited

U.S. PATENT DOCUMENTS

| | | |
|---|---|---|
| 3,841,954 A | 10/1974 | Lawler |
| 4,622,254 A | 11/1986 | Nishimura et al. |
| 4,913,937 A | 4/1990 | Engdahl et al. |
| 5,185,195 A | 2/1993 | Harpell et al. |
| 5,187,023 A | 2/1993 | Prevorsek et al. |
| 5,196,252 A | 3/1993 | Harpell |
| 5,198,280 A | 3/1993 | Harpell et al. |
| 5,254,383 A | 10/1993 | Harpell et al. |
| 5,316,820 A | 5/1994 | Harpell et al. |
| 5,362,527 A | 11/1994 | Harpell et al. |
| 5,591,933 A | 1/1997 | Li et al. |
| 5,677,029 A | 10/1997 | Prevorsek et al. |
| 5,789,327 A | 8/1998 | Rousseau |
| 6,408,733 B1 | 6/2002 | Perciballi |
| 6,861,378 B2 | 3/2005 | Cunningham et al. |
| 6,949,280 B2 * | 9/2005 | Brillhart et al. ............... 428/105 |
| 7,718,245 B2 | 5/2010 | Bhatnagar et al. |
| 7,820,565 B2 | 10/2010 | van Heerden et al. |
| 7,964,518 B1 | 6/2011 | Bhatnagar et al. |
| 8,132,494 B1 | 3/2012 | Nguyen et al. |

FOREIGN PATENT DOCUMENTS

WO 91/07632 5/1991

\* cited by examiner

*Primary Examiner* — Arti Singh-Pandey
(74) *Attorney, Agent, or Firm* — Lee & Hayes, PLLC

(57) ABSTRACT

The present disclosure is directed to a composite armor system and method of manufacturing the same including a composite armor system that includes a first bulk bonded fibrous layer, a second bonded fibrous layer bonded to the first bulk bonded fibrous layer and a third bonded fibrous layer. At least one release layer is disposed between the second bonded fibrous layer and the third bonded fibrous layer and a joining mechanism that joins the second bonded fibrous layer to the third bonded fibrous layer through apertures in the release layer into a joined bonded substratum layer. The release layer prevents bonding between the second bonded fibrous layer and the third bonded fibrous layer at opposite portions of the release layer contacting both the second bonded fibrous layer and the third bonded fibrous layer.

13 Claims, 6 Drawing Sheets

SYSTEM OF COMPOSITE ARMOR INCLUDING RELEASE LAYERS

STATEMENT OF RIGHTS OWNED

The invention was made with Government support awarded by the Department of the U.S. Army according to Contract No. W911-W6-10-2-0001. The government has certain rights in this invention.

TECHNICAL FIELD

The field of the embodiments presented herein is directed toward light-weight composite armor systems using multiple layers of high tensile strength fibrous material and the manufacturing of these composite armor systems.

BACKGROUND

Modern body armor was developed which consisted principally of metal plates sewn together with ballistic nylon and was intended to protect against shrapnel and to slight extent, light weapon fire. The main disadvantage of this type of armor is that it is heavy and very bulky. Recent developments of high tensile-strength fibers have produced sheets of anti-ballistic panels by combining woven fabrics and cross-ply laminates.

Recent improvements to these anti-ballistic panels focus on the addition of more combined layers that result in the panels becoming quite thick and bulky. To reduce thickness, the anti-ballistic capabilities of a panel were improved by providing one or more metal plates in front of or in-between layers of fabric, which again produce armor that is heavy and very bulky. Other advances have been directed to making the improved panel more rigid by substantially coating each fiber with an elastomer in a manufacturing procedure that is both complex and costly.

Increasing the anti-ballistic integrity and capability of body armor by increasing the thickness or by coating individual fibers of the cloth is not a satisfactory approach to providing lightweight, flexible and effective ballistic articles. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a composite armor system includes a first bulk bonded fibrous layer, a second bonded fibrous layer bonded to the first bulk bonded fibrous layer and a third bonded fibrous layer. At least one release layer is disposed between the second bonded fibrous layer and the third bonded fibrous layer and a joining mechanism that joins the second bonded fibrous layer to the third bonded fibrous layer through apertures in the release layer into a joined bonded substratum layer. The release layer prevents bonding between the second bonded fibrous layer and the third bonded fibrous layer at opposite portions of the release layer contacting both the second bonded fibrous layer and the third bonded fibrous layer.

In another embodiment disclosed herein, a method of manufacturing composite armor includes creating a joined substratum layer by applying a pattern of stitching through a first section of uncured fibrous layers, a second section of uncured fibrous layers, and release ply layer disposed between the first section of uncured fibrous layers and the second section of uncured fibrous layers. A third bulk section of uncured fibrous layers is positioned on the joined substratum layer to contact a portion of one of the first section of uncured fibrous layers and the second section of uncured fibrous layers. A compressive force is applied to the joined substratum layer and the third bulk section of uncured fibrous layers in addition to temperature curing the fibrous layers within the joined substratum layer and the third bulk section. The joining of cured fibrous layers between the first section of cured fibrous layers and the second section of fibrous layers is prevented as a result of the release ply layer.

In another embodiment disclosed herein, a method of manufacturing composite armor includes creating a substratum layer that includes a first section of uncured fibrous layers and a release ply layer disposed on the first section of uncured fibrous layers, where the release ply layer includes a number of apertures therein. A second bulk section of uncured fibrous layers is positioned on the substratum layer to contact a portion of the release ply layer. A compressive force is applied to the substratum layer and the second bulk section of uncured fibrous layers in addition to temperature curing the fibrous layers within the substratum layer and the second bulk section. The cured fibrous layers are joined between the first section of cured fibrous layers and the second bulk section of cured fibrous layers through the apertures in the release ply layer, and the release ply layer prevents joining of cured fibrous layers between the first section of cured fibrous layers, and the second bulk section of cured fibrous layers at portions where the release ply layer contacts the first section of cured fibrous layers and a corresponding opposite portion on the second bulk section of the cured fibrous layers.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

Embodiments presented herein are for a composite armor system having a small section of high strength polymer ply layers being mechanically joined together to form a section of layers separated by an internal release layer. The high strength polymer ply layers may have high levels of toughness, durable visco-elastic properties, and may withstand high-loads at high-strain rates. The small section of joined layers is then joined to a larger bulk section of multiple high strength polymer layers. The armor system is then temperature cured under pressure to form a rigid armor unit. The small section is able to deflect and separate from the larger bulk section by means of the release layer when a projectile penetrates though the larger bulk section. The smaller section acts like a catcher to deflect and separate from the larger bulk section, and yet still remain attached due to being mechanically joined together.

The combination of at least one "release" ply and mechanical joining of the small section of plies through the release ply yields a significant improvement in the prevention of ballistic penetration. Release plies are typically used when fabricating polymer composite parts. They are typically placed on the surface of a part so that materials can be easily removed after a temperature cure is complete. Release plies are typically made of materials that adhere poorly and promote separation. They are also referred to as "separator" plies. The functional concept is to release a small number of exit side plies, then "anchor" the released plies into the rest of the laminate with stitching or selective curing of small portions of polymer plies that join oppositely disposed layers through small apertures in the release ply. The objective is to maximize the ballistic performance by varying the amount and type of stitching/joining, adjusting (or "tuning") the backside compliance (or "give") so that the force applied to the projectile remains below that which would result in penetration of the composite armor.

Generally, the manufacturing sequence is to place the release ply between a stack of unconsolidated (uncured) high strength polymer plies, then stitch this stack together using an industrial sewing machine, or later joining the polymer plies that are disposed on opposite sides of a single release ply by temperature and pressure curing portions of polymer ply through apertures in the release layer. A bulk layer of plies of high strength polymer plies are then placed on top of the stitched plies. The panel is consolidated using pressure and elevated temperature, bonding the plies to one another except where the release ply prevents adhesion.

Figure 1:
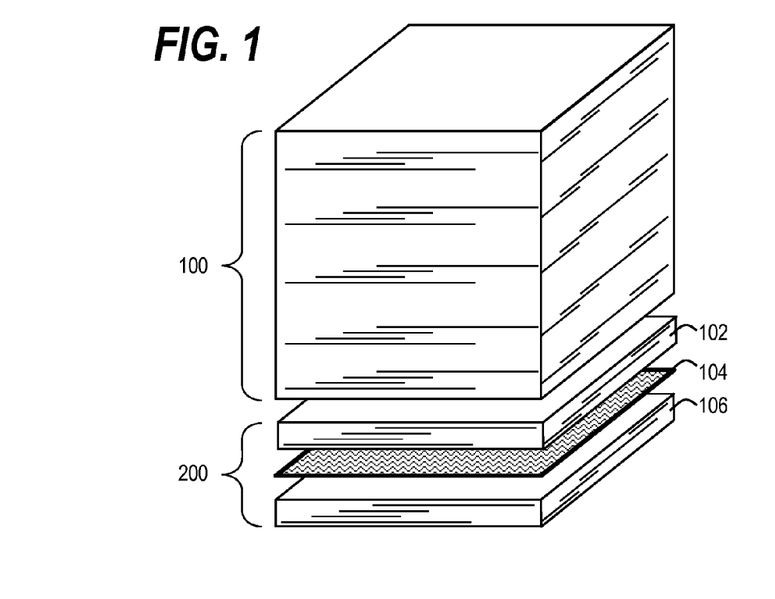
FIG. 1 illustrates one embodiment presented herein of a composite armor system according to at least one embodiment disclosed herein.

FIG. 1 illustrates a composite armor system that includes a first bulk bonded fibrous layer 100, a second bonded fibrous layer 102 bonded to the first bulk bonded fibrous layer 100 and a third bonded fibrous layer 106. At least one release layer 104 may be disposed between the second bonded fibrous layer 102 and the third bonded fibrous layer 106. These fibrous layers in either their pre-temperature cured unbounded state, or their post-temperature cured bonded state may include any suitable lightweight high tensile strength material including, but not limited to Ultra High Molecular Weight Polyethylene (UHMWPE).

Figure 5:
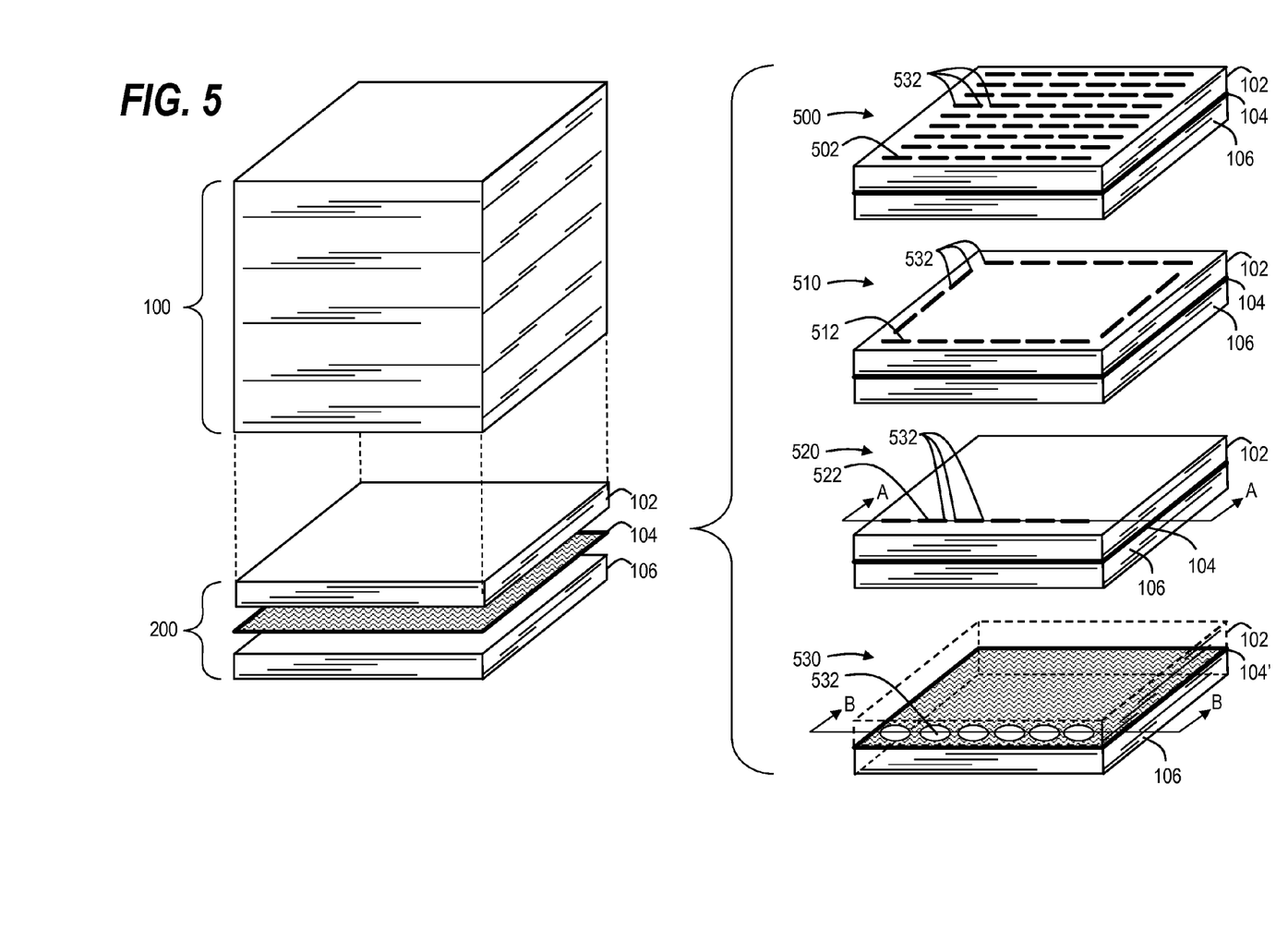
FIG. 5 illustrates another embodiment presented herein, similar to FIG. 1, of a composite armor system including a number of joining mechanisms that create a joined substratum layer.

A number of joining mechanisms, (as shown in FIG. 5), join the second bonded fibrous layer 102 to the third bonded fibrous layer 106 through apertures (as shown in FIG. 5) in the release layer to form a joined bonded substratum layer 200. (This joined bonded substratum layer 200 will be referenced generally by reference number 200 although it may take different configurations as disclosed below.) Generally, the release layer 104 prevents bonding between the second bonded fibrous layer 102 and the third bonded fibrous layer 106 at opposite portions or side of the release layer that come in contact with both the second bonded fibrous layer 102 and the third bonded fibrous layer 106. The release layer may include any suitable lightweight release material having a low coefficient of both friction and shear stress, for example, fluorinated ethylene propylene (FEP) or polytetrafluoroethylene (PTFE).

Figure 2:
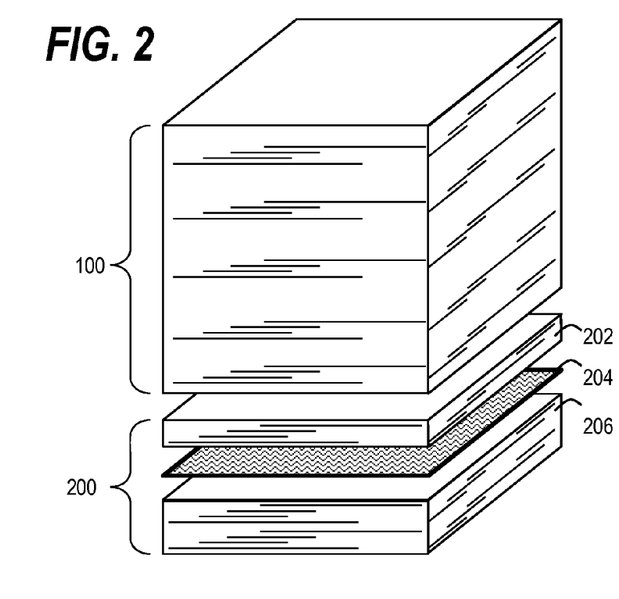
FIG. 2 illustrates an alternative embodiment presented herein of a composite armor system similar to the embodiment shown in FIG. 1.

In FIG. 1, the composite armor system may have a thickness ratio of approximately 1:5 between the joined bonded substratum layer 200 and the first bulk bonded fibrous layer 100, where the third bonded fibrous layer 106 may be substantially equal in thickness to the second bonded fibrous layer 102. FIG. 2 illustrates an alternative embodiment presented herein similar to the embodiment shown in FIG. 1, where the armor system includes the first bulk bonded fibrous layer 100, a second bonded fibrous layer 202 bonded to the first bulk bonded fibrous layer 100 and a third bonded fibrous layer 206. At least one release layer 204 may be disposed between the second bonded fibrous layer 202 and the third bonded fibrous layer 206. In this embodiment, a thickness ratio of approximately 1:3 is maintained between the joined bonded substratum layer 200 and the first bulk bonded fibrous layer 100, where the third bonded fibrous layer 206 may be approximately twice the thickness of the second bonded fibrous layer 202.

Figure 3:
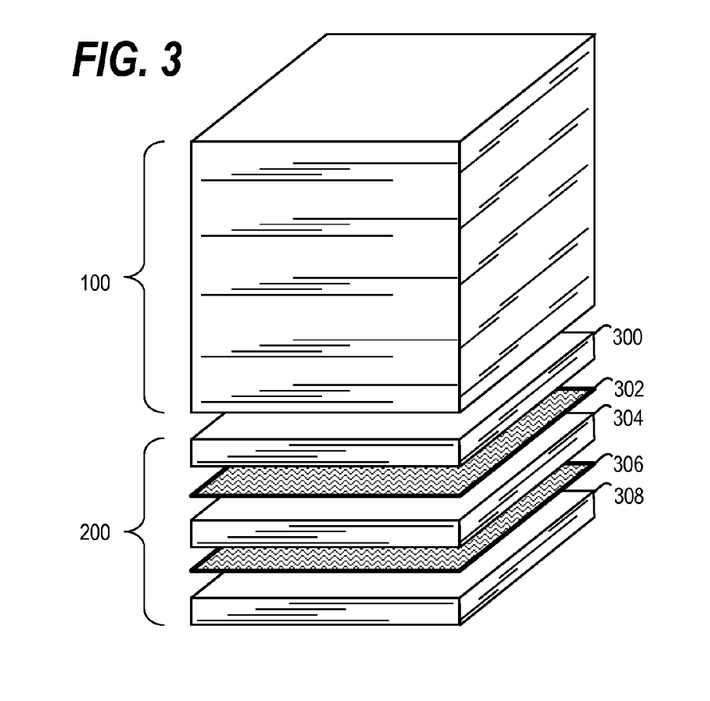
FIG. 3 illustrates another embodiment presented herein of a composite armor system similar to the embodiment shown in FIG. 1.

FIG. 3 illustrates another embodiment presented herein similar to the embodiment shown in FIG. 1, where the armor system includes the first bulk bonded fibrous layer 100, a second bonded fibrous layer 300 bonded to the first bulk bonded fibrous layer 100, a third bonded fibrous layer 304 and a fourth bonded fibrous layer 308. A first release layer 302 may be disposed between the second bonded fibrous layer 300 and the third bonded fibrous layer 304. A second release layer 306 may be disposed between the fourth bonded fibrous layer 308 and the third bonded fibrous layer 304. In this embodiment, the joined bonded substratum layer 200 includes the second 300, third 304 and fourth 308 bonded fibrous layers with the first 302 and second 306 release layers alternating between the fibrous layers. In this embodiment, a thickness ratio of approximately 1:3 is maintained between the joined bonded substratum layer 200 and the first bulk bonded fibrous layer 100, where the fourth bonded fibrous layer 308 may be substantially equal in thickness to the second bonded fibrous layer 300 and the third bonded fibrous layer 304.

Figure 4:
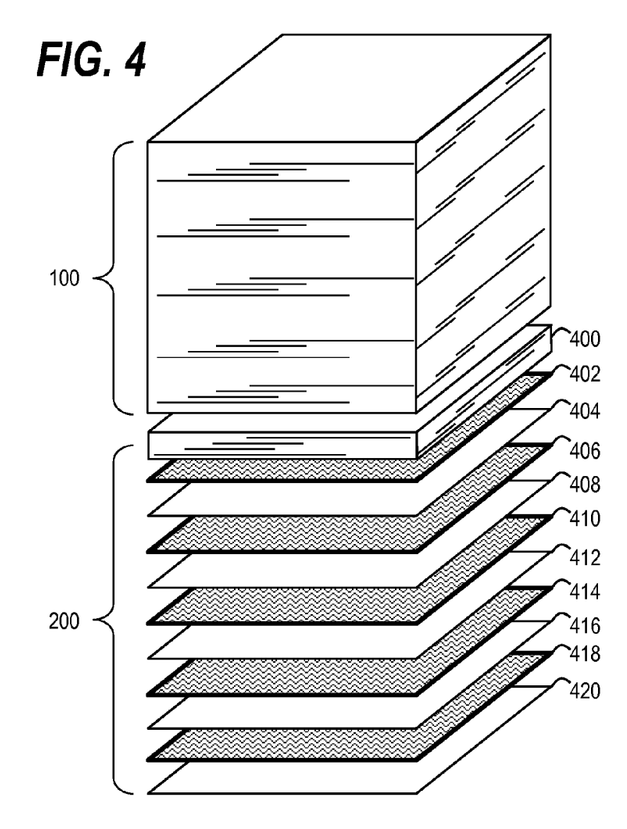
FIG. 4 illustrates another embodiment presented herein of a composite armor system similar to the embodiment shown in FIG. 3.

FIG. 4 illustrates another embodiment presented herein similar to the embodiment shown in FIG. 3, where the armor system includes a number of additional bonded fibrous layers, (400, 404, 408, 412, 416 and 420), and a number of additional release layers (402, 406, 410, 414 and 418), disposed between each of the number of additional bonded fibrous layers. The joined bonded substratum layer 200 includes the alternating bonded fibrous layers and release layers, where a thickness ratio of approximately 1:5 is maintained between the joined bonded substratum layer and the first bulk bonded fibrous layer. The additional bonded fibrous layers (404, 408, 412, 416 and 420) may be substantially equal in thickness to each other, while the top-most bonded fibrous layer 400 may be up to five times the thickness of these additional layers to ensure that threading mechanisms joining the alternating bonded fibrous layers and release layers, (as described below and illustrated in FIG. 5), are sufficiently anchored in the top-most bonded fibrous layer 400.

FIG. 5 illustrates another embodiment presented herein, similar to FIG. 1, of a composite armor system including four exemplary embodiments of joining mechanisms used to create the joined bonded substratum layer 200. These joining mechanisms may be used to join any of the joined bonded substratum layers 200 as illustrated in FIGS. 1-4.

A first mechanism to the joining substratum layers 200 by threading the different sections of the joined bonded substratum layers 200 with thread that penetrates, for example, the second bonded fibrous layer 102, the release layer 104 and the third bonded fibrous layer 106 via apertures 532. A first joined substrate layer 500 may include a threading pattern 502 having a pitch of approximately 0.3 inches and a stitch line spacing of approximately 0.5 inches. This pattern may substantially cover most of the joined bonded substratum layers 200 surface area, or only a portion thereof.

A second joined substrate layer 510 may include a threading pattern 512 having a pitch of approximately 0.3 inches around a perimeter of the joined bonded substratum layer with thread that penetrates, for example, the second bonded fibrous layer 102, the release layer 104 and the third bonded fibrous layer 106 via apertures 532. A third joined substrate layer 520 may include a threading pattern 522 having a pitch of approximately 0.3 inches along at least one side of a perimeter of the joined bonded substratum layer with thread that penetrates, for example, the second bonded fibrous layer 102, the release layer 104 and the third bonded fibrous layer 106 via apertures 532.

A fourth joined substrate layer 530 illustrates a second mechanism to the joined substratum layers 200 by having at least one fibrous portion of the second bonded fibrous layer 102 bonding with a corresponding fibrous portion of the third bonded fibrous layer 106 though at least one aperture 532 in the release layer 104'. Note that the second bonded fibrous layer 102 is shown in hidden lines to reveal the details of the release layer 104' in this embodiment. An alternative configuration of this embodiment may completely exclude the second bonded fibrous layer 102 altogether such that the release layer 104' with the apertures described below interfaces directly to the bottom of the first bulk bonded fibrous layer 100. Thus, in this alternative embodiment, and with respect of the previously illustrated embodiments of FIGS. 1-5, the release layer 104' having a number of apertures would directly contact the bulk fibrous layer 100 without the second bonded fibrous layer 102 of FIG. 1, without the second bonded fibrous layer 202 of FIG. 2, without the second bonded fibrous layer 300 of FIG. 3, or without the top-most bonded fibrous layer 400 of FIG. 4.

The aperture 532 may include an array of apertures in the release layer 104' including a number of rows and columns, similar to the threading pattern 502 of first joined substrate layer 500, or a series of apertures in the release layer 104' around a perimeter of the joined bonded substratum layer, similar to the threading pattern 512 of second joined substrate layer 510. Additionally, the aperture 532 may include at least one row of apertures in the at least one release layer 104' along at least one side of the perimeter of the joined bonded substratum layer 530 similar to the threading pattern 522 of third joined substrate layer 520, as shown.

Figure 6:
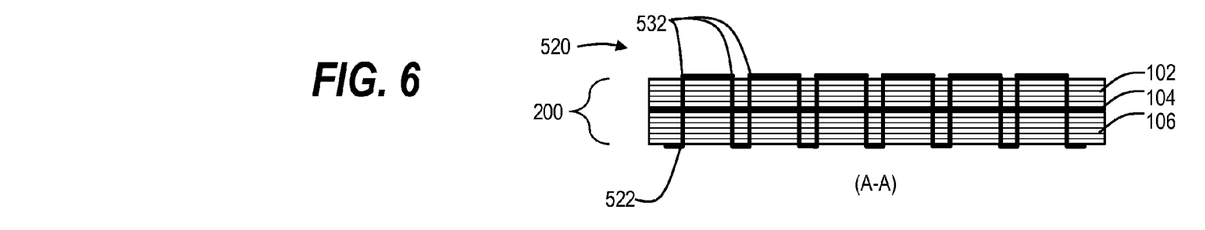
FIG. 6 illustrates another embodiment presented herein of a cross section of line (A-A) as shown in FIG. 5.

FIG. 6 illustrates a cross section of line (A-A) of the third joined substrate layer 520 as shown in FIG. 5, where threading 522 is illustrated as penetrating through the second bonded fibrous layer 102, the release layer 104 and the third bonded fibrous layer 106.

Figure 7A:
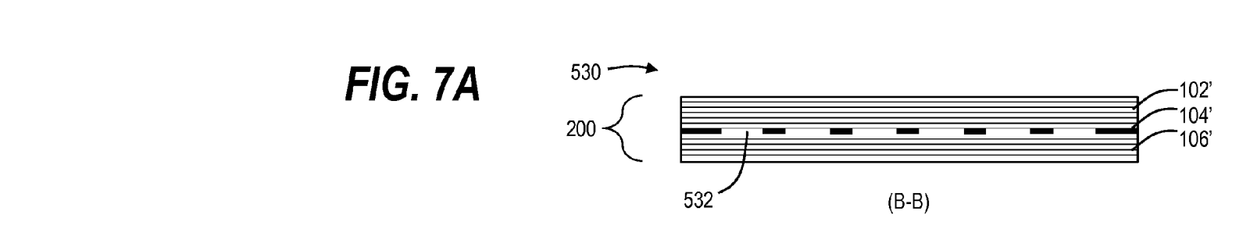
FIG. 7A illustrates another embodiment presented herein of a cross section of line (B-B) as shown in FIG. 5 in an uncured state.

FIG. 7A illustrates a cross section of line (B-B) of the fourth joined substrate layer 530 as shown in FIG. 5 in an uncured state, where at least one aperture 532 in the release layer 104' creates a small gap between the first uncured fibrous layer 102' and the second uncured fibrous layer 106'.

Figure 7B:
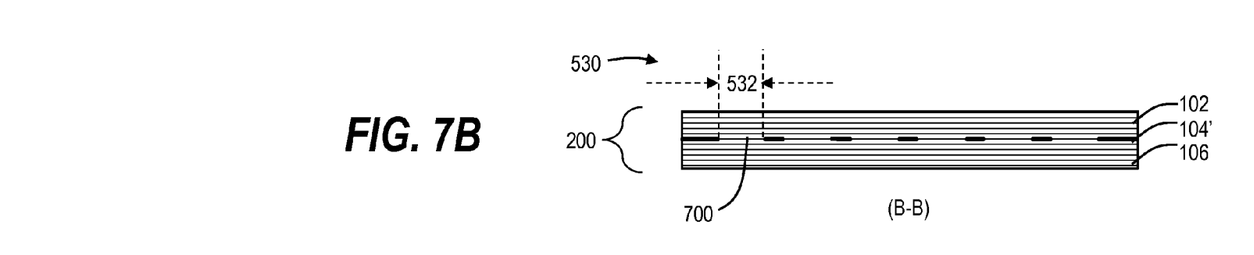
FIG. 7B illustrates another embodiment presented herein of a cross section of line (B-B) as shown in FIG. 5 in a cured state.

FIG. 7B illustrates the cross section of line (B-B) as shown in FIG. 5 in a cured state, where the aperture 532 of FIG. 7A is now filled with cured fibrous portions 700 that join together the first cured fibrous layer 102 and the second cured fibrous layer 106. In this cured embodiment, the release layer 104' still separates the first and second cured fibrous layers at every portion where the release layer 104' is between both layers. However, the cured fibrous portions 700 of the first and second fibrous layers that meld through the aperture 532 due to a pressure and heat curing process now maintain a mechanical connection between the layers on either side of the release layer 104'.

Figure 8:
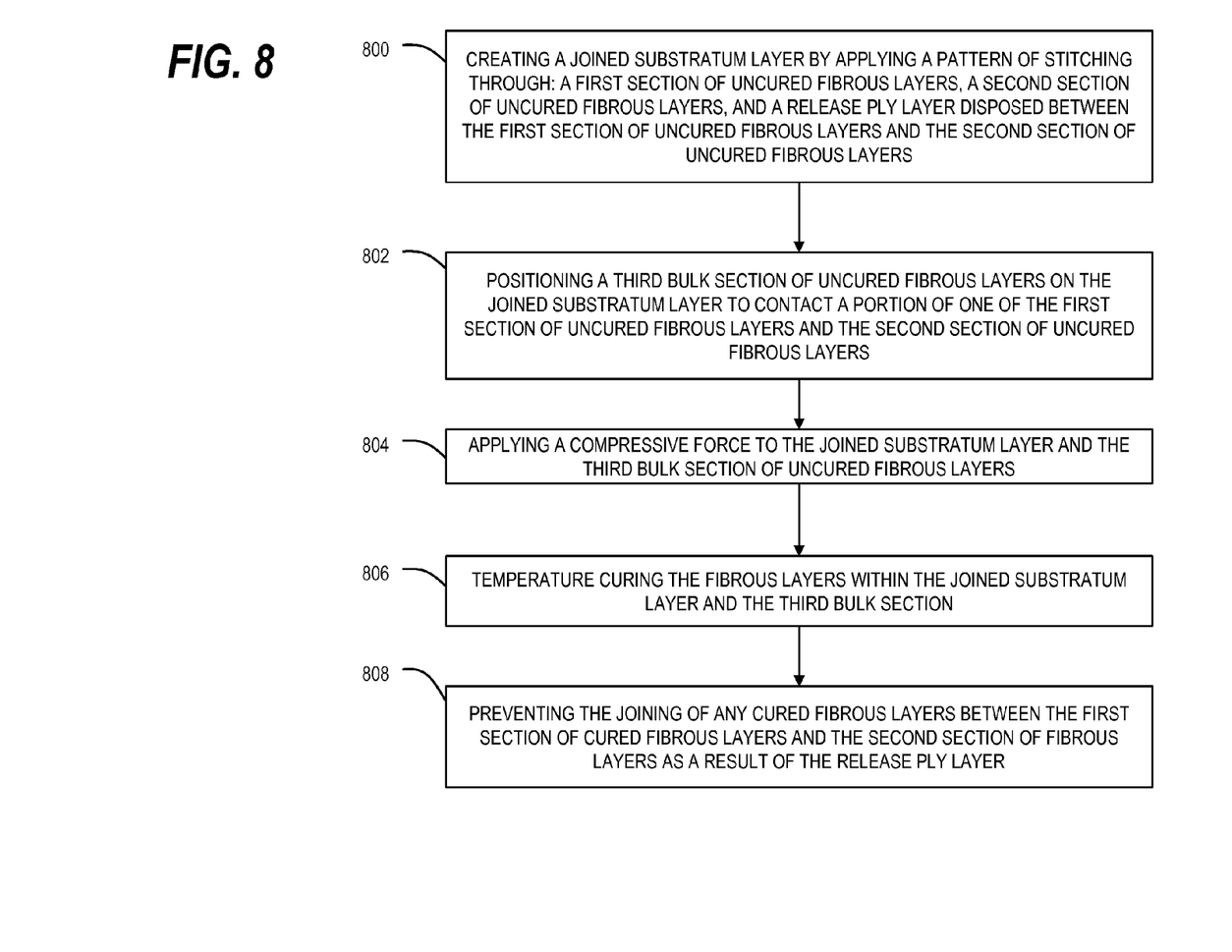
FIG. 8 illustrates an embodiment of a method of manufacturing an armor system according to at least one embodiment disclosed herein.

FIG. 8 illustrates an embodiment of a method of manufacturing an armor system that includes creating 800 a joined bonded substratum layer by applying a pattern of stitching through a first section of uncured fibrous layers, a second section of uncured fibrous layers, and a release ply layer disposed between the first section of uncured fibrous layers and the second section of uncured fibrous layers. A third bulk section of uncured fibrous layers is positioned 802 on the joined bonded substratum layer to contact a portion of one of the first section of uncured fibrous layers and the second section of uncured fibrous layers. A compressive force is applied 804 to the joined bonded substratum layer and the third bulk section of uncured fibrous layers. The fibrous layers are temperature cured 806 within the joined bonded substratum layer and the third bulk section, and the joining of cured fibrous layers between the first section of cured fibrous layers and the second section of fibrous layers are prevented 808 as a result of the release ply layer.

The method of manufacturing may further include creating the pattern of stitching having a pitch of approximately 0.3 inches and a stitch line spacing of approximately 0.5 inches, a pitch of approximately 0.3 inches around a perimeter of the joined bonded substratum layer, or a pitch of approximately 0.3 inches along at least one side of a perimeter of the joined bonded substratum layer.

The method of manufacturing may further provide a thickness ratio between the joined bonded substratum layer and the first bulk bonded fibrous layer being a range approximately 1:3 to 1:5.

Figure 9:
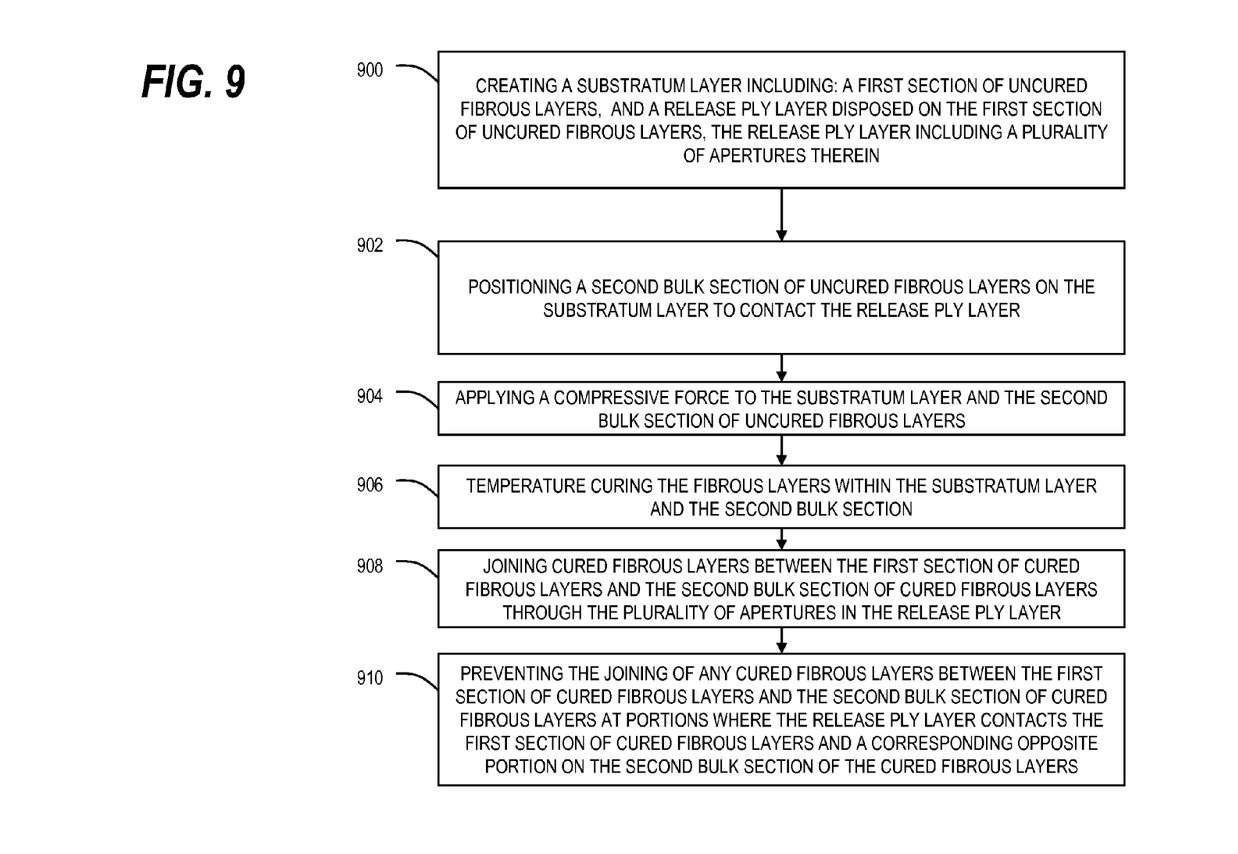
FIG. 9 illustrates another embodiment of a method of manufacturing an armor system according to at least one additional embodiment disclosed herein.

FIG. 9 illustrates another embodiment of a method of manufacturing an armor system that includes creating 900 a substratum layer having a first section of uncured fibrous layers and a release ply layer disposed on the first section of uncured fibrous layers, where the release ply layer including a number of apertures therein. A second bulk section of uncured fibrous layers may be positioned 902 on the substratum layer to contact release ply layer. A compressive force is applied 904 to the substratum layer and the second bulk section of uncured fibrous layers, and the fibrous layers are temperature cured 906 within the substratum layer and the second bulk section. The cured fibrous layers are joined 908 between the first section of cured fibrous layers and the second bulk section of cured fibrous layers through the number of apertures in the release ply layer, however, the release ply layer prevents 910 the joining of cured fibrous layers between the first section of cured fibrous layers and the second bulk section of cured fibrous layers at portions where the release ply layer contacts the first section of cured fibrous layers and a corresponding opposite portion on the second bulk section of the cured fibrous layers.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A composite armor system comprising:
   a first bulk bonded fibrous layer;
   a second bonded fibrous layer bonded to the first bulk bonded fibrous layer;
   a third bonded fibrous layer;
   at least one release layer disposed between the second bonded fibrous layer and the third bonded fibrous layer; and
   a joining mechanism that joins the second bonded fibrous layer to the third bonded fibrous layer through apertures in the at least one release layer into a joined bonded substratum layer,
   the at least one release layer preventing bonding between the second bonded fibrous layer and the third bonded fibrous layer at opposite portions of the at least one release layer that contact both the second bonded fibrous layer and the third bonded fibrous layer.

2. The composite armor system according to claim 1, a thickness ratio between the joined bonded substratum layer and the first bulk bonded fibrous layer being approximately 1:5,
   the third bonded fibrous layer being substantially equal in thickness to the second bonded fibrous layer.

3. The composite armor system according to claim 1, a thickness ratio between the joined bonded substratum layer and the first bulk bonded fibrous layer being approximately 1:3,
   the third bonded fibrous layer being approximately twice the thickness of the second bonded fibrous layer.

4. The composite armor system according to claim 1, further comprising:
   a fourth bonded fibrous layer; and
   a second release layer disposed between the fourth bonded fibrous layer and the third bonded fibrous layer,
   the joined bonded substratum layer further including the second release layer and the fourth bonded fibrous layer,
   wherein a thickness ratio between the joined bonded substratum layer and the first bulk bonded fibrous layer being approximately 1:3,
   the fourth bonded fibrous layer being substantially equal in thickness to the second bonded fibrous layer and the third bonded fibrous layer.

5. The composite armor system according to claim 1, further comprising:
   a plurality of additional bonded fibrous layers; and
   a plurality of additional release layers disposed between each of the plurality of additional bonded fibrous layers,
   the joined bonded substratum layer further including the plurality of additional bonded fibrous layers and the plurality of additional release layers,
   wherein a thickness ratio between the joined bonded substratum layer and the first bulk bonded fibrous layer being approximately 1:5.

6. The composite armor system according to claim 1, the joining mechanism further comprising threading that penetrates the second bonded fibrous layer, the at least one release layer and the third bonded fibrous layer.

7. The composite armor system according to claim 6, the threading comprising a pattern having a pitch of approximately 0.3 inches and a stitch line spacing of approximately 0.5 inches.

8. The composite armor system according to claim 6, the threading comprising a pattern having a pitch of approximately 0.3 inches around a perimeter of the joined bonded substratum layer.

9. The composite armor system according to claim 6, the threading comprising a pitch of approximately 0.3 inches along at least one side of a perimeter of the joined bonded substratum layer.

10. The composite armor system according to claim 1, the joining mechanism further comprising at least one fibrous portion of the second bonded fibrous layer bonding with a corresponding fibrous portion of the third bonded fibrous layer though at least one aperture in the at least one release layer.

11. The composite armor system according to claim 10, the at least one aperture in the at least one release layer comprising one of:
    an array of apertures in the at least one release layer including a plurality of rows and columns;
    a series of apertures in the at least one release layer around a perimeter of the joined bonded substratum layer; and
    at least one row of apertures in the at least one release layer along at least one side of the perimeter of the joined bonded substratum layer.

12. The composite armor system according to claim 1, wherein the fibrous layers of the first bulk bonded fibrous layer, the second bonded fibrous layers and the third bonded fibrous layer comprise Ultra High Molecular Weight Polyethylene (UHMWPE).

13. The composite armor system according to claim 1, wherein at least one release layer comprises either fluorinated ethylene propylene (FEP) or polytetrafluoroethylene (PTFE).

* * * * *